(12) United States Patent
Reeves

(10) Patent No.: US 6,398,158 B1
(45) Date of Patent: Jun. 4, 2002

(54) HIGH ALTITUDE LOW FLYING PLATFORM HULL

(75) Inventor: John M. L. Reeves, Prince Frederick, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/888,416

(22) Filed: Jun. 22, 2001

(51) Int. Cl.⁷ .............................................. B64C 35/00
(52) U.S. Cl. ........................ 244/12.1; 244/15; 244/36; 244/105
(58) Field of Search ........................ 244/15, 105, 106, 244/36, 12.1, 91; 114/272, 283, 61.2; 180/126

(56) References Cited

U.S. PATENT DOCUMENTS

| | | | |
|---|---|---|---|
| 2,483,663 A | * 10/1949 | Nowak | 114/61.2 |
| 2,775,419 A | * 12/1956 | Hlobil | 244/36 |
| 3,412,956 A | 11/1968 | Cockerell | |
| 3,515,236 A | 6/1970 | Weiland | |
| 3,627,235 A | 12/1971 | Lippisch | |
| 3,661,111 A | 5/1972 | Lippisch | |
| 3,830,179 A | 8/1974 | Lippisch | |
| 4,151,893 A | 5/1979 | Mantle | |
| 4,705,234 A | 11/1987 | Bourn | |
| 4,712,630 A | 12/1987 | Blum | |
| 4,926,773 A | * 5/1990 | Manor | 114/61.2 |
| 5,065,833 A | 11/1991 | Matsuoka et al. | |
| 5,105,898 A | 4/1992 | Bixel | |
| 5,273,238 A | 12/1993 | Sato | |
| 5,289,995 A | * 3/1994 | Greene | 244/15 |
| 5,314,035 A | 5/1994 | Schoell | |
| 5,335,742 A | 8/1994 | Blum | |
| 5,566,775 A | 10/1996 | Schoell | |
| 5,588,389 A | 12/1996 | Carter | |
| 5,622,133 A | 4/1997 | Sinitsyn et al. | |
| 5,676,087 A | 10/1997 | Baker | |
| 5,697,468 A | 12/1997 | Russell et al. | |
| 5,738,302 A | 4/1998 | Freeland | |
| 5,746,146 A | 5/1998 | Bixel | |

FOREIGN PATENT DOCUMENTS

GB          2 326 396 A          12/1998

OTHER PUBLICATIONS

Eugene Handler, "Practical Considerations Regarding Wing–in–Ground Effect Aircraft", J. Hydronautics, vol. II, No. 2, Apr. 1977, USA.

* cited by examiner

Primary Examiner—Galen L. Barefoot
(74) Attorney, Agent, or Firm—Mark O. Glut

(57) ABSTRACT

A high altitude low flying platform hull, including a laminar flow airfoil, a first slab side, a second slab side, a first fin and a second fin. The laminar flow airfoil has a nose, the nose has a nose leading edge. The first slab side has a first slab side leading edge and a first slab side trailing edge. The first slab side has a serpentine or s-shaped first slab side leading edge. The second slab side has a second slab side leading edge and a second slab side trailing edge. The second slab side has a serpentine or s-shaped second slab side leading edge. The first slab side and second slab side mate to the laminar flow airfoil. The first slab side leading edge and second slab side leading edge intersect the nose leading edge. The first slab side trailing edge extends upward to create the first fin, and the second slab side trailing edge extends upward to create the second fin.

14 Claims, 7 Drawing Sheets

HIGH ALTITUDE LOW FLYING PLATFORM HULL

STATEMENT OF GOVERNMENT INTEREST

The invention described herein may be manufactured and used by or for the Government of the United States of America for governmental purposes without payment of any royalties thereon or therefor.

BACKGROUND

The present invention relates to a high altitude low flying platform hull. More specifically, but without limitation, the present invention relates to an aerodynamic, hydrodynamic and aerohydrodynamic containment lifting hull for a balanced on air aircraft ("Balonair").

A balanced on air aircraft is a type of aircraft that can travel via surface effect and travel similarly to a conventional airplane. Travel via surface effect is a type of travel whereby a platform travels just above a surface (water, land, ice, etc.) A balanced on air aircraft is also a type of aircraft that can travel via surface effect approximately two span heights (a span is typically the maximum width of an aircraft from wingtip to wingtip) above a surface, or from within the two heights to any altitude up to a service ceiling (which will be generally higher than a conventional aircraft because of the lower wing loading.) A balanced on air aircraft differs from a seaplane or flying boat in that a balanced on air aircraft has the ability to sit in the water like a catamaran boat (a boat with two parallel hulls) with reduced heave, pitch, roll and yaw motions, and without the possibility of the outrigger floats (which are on flying boats or seaplanes) being torn off by heavy weather and high loads imposed by large waves.

A hull is typically, but without limitation, the frame or main body of a ship, vehicle or aircraft. A platform is anything that lends a solid base from which to do something. A platform can also refer to a means of transport such as a ship, an aircraft, or ground vehicle, from which weapons can be deployed. The platform hull is thus, but without limitation, one of the body parts that supports the wing/fuselage/tailplane combination when the platform is at rest.

Surface effect platforms move just above the water, ground, ice, or a combination of terrain. This makes surface effect platforms more efficient than either a water platform, like a boat or ship, or a ground platform like an automobile, a truck, or a tank. When a platform is in contact with water, the ground or terrain there is a large coefficient of friction. When a platform moves through a gas like air, the coefficient of friction is substantially reduced.

Surface effect platforms may also transport cargo and people over both land and water without unloading or reloading the passengers or cargo. This saves a tremendous amount of time, which can be very important during emergencies or during military exercises or actions.

In surface effect platforms, the air flowing into the hollow space under the hull generates a buildup of air pressure during flight near the surface. This build up of air acts in a similar manner to an air cushion on which a surface effect platform can slide.

Flying aircraft use the low pressure flow of air over the aircraft wing and the high pressure flow beneath the wing to create lift. Surface effect platforms use the high pressure flow of air beneath an airfoil to produce a cushion of air between the platform and a surface to separate the platform from the surface.

Because flying aircraft and surface effect platforms utilize different scientific and aerodynamic principles to operate, it has been difficult to find a hull that can be effectively and safely used for both flying and surface effect travel. Conventional aircraft hulls are unstable when used during surface effect or low altitude and tend to generate large drag components (a resistant force exerted in the direction opposite to the direction of motion and parallel to the relative gas or air stream). This occurs especially when approaching the speed of sound and is due to the base drag of the steps and difficulty of fairing the hull to obtain a desirable aerodynamic shape. Fairing the hull describes a process to streamline the hull of a platform, especially for reducing wind resistance or drag, and to fit one part into another part as to present a streamlined surface. The large drag components of conventional aircraft hulls do not allow a platform to travel long distances and/or at high speeds via surface effect. Furthermore, conventional surface effect hulls are unstable during high altitude flight and typically do not augment lift for take-off.

Seaplanes or flying boats, which operate from the water, typically rest on a flotation device such as a hull, pontoon, float, or air cushion system (Hovercraft type). To achieve take-off, the aircraft must obtain dynamic lift from a planing bottom, skis, hydrofoils or an air cushion system. Hulls for seaplanes and flying boats come in varied designs from single (mono) through trimaran (boat with three hulls). Floats are used on General Aviation floatplanes to allow them to land and take off from water. For higher speeds for takeoff, floats and seaplane hulls use one or more additional steps to assist in breaking the surface tension of the water and to avoid porpoising (to skip, rise and plunge repeatedly while moving across the water). Typically hulls used on seaplanes have bad spray patterns when traveling on or over the water, and provide significant performance penalties and potential hull and/or aircraft erosion. Seaplane hulls cannot safely travel over or just above ground (surface effect) because they are specifically designed for travel on water. In addition, a platform with a delta wing cannot use conventional seaplane hulls primarily because of the volumetric distribution of the seaplane hulls.

Surface effect, unlike true flight, traps air between the hull/wing/platform and the surface, and augments, on a delta wing, the lift on the top surface of the wing. High lift chambered hulls, typically cargo aircraft, have difficulty remaining in surface effect when airspeed is sufficient to generate the lift required to fly.

Thus, there is a need in the art to provide a high altitude low flying platform hull that incorporates the listed benefits without the limitations inherent in current Naval Architecture and Aviation practice.

SUMMARY

The instant invention is directed to a high altitude low flying platform hull that satisfies the needs enumerated above and below.

The present invention is directed to a high altitude low flying platform hull that includes a laminar flow airfoil, a first side slab, a second side slab, a first fin and a second fin. The laminar flow airfoil includes a nose with a nose leading edge. The first slab side contains a first slab side leading edge and a first slab side trailing edge. The second slab side contains a second slab side leading edge and a second slab side trailing edge. Both the first slab side leading edge and the second slab side leading edge are serpentine or s-shaped. The first slab side and second slab side mate to the laminar flow airfoil and the first slab side leading edge and second slab side leading edge intersect the nose leading edge. The first fin is created by the first slab side trailing edge extending upward. The second fin is created by the second slab side trailing edge extending upward. Both fins may be contoured to assist in area ruling the platform by the use of equivalent area rule technique. The area rule concept is a concept of aircraft design based on a notion that interference drag at transonic speeds depends almost entirely on the distribution of the aircraft's total cross-sectional area along the direction of flight. Transonic speed is typically defined as a speed at which an aircraft or other body moves relative to surrounding fluid (liquid or gas) when one or more local points on a body are moving at subsonic speed (less than the speed of sound) at the same time one or more other points on the body move at sonic (the speed of sound) or supersonic speed (greater than the speed of sound). The transonic range for a particular platform depends on its design, but may spread for some platforms between approximately Mach 0.8 and Mach 1.2. (Mach 1 is a speed equal to the speed of sound in the medium the object is traveling, Mach 0.5 is a speed equal to one-half the speed of sound in the medium, Mach 1.33 is a speed one third greater than the speed of sound in the medium.)

One of the primary advantages of the high altitude low flying platform hull is that it promotes and utilizes laminar flow when in close proximity to the surface. The first slab side and second slab side constrain debris and spray to pass under the hull rather than into it and also seal the ram air cushion between the slab sides themselves and the laminar flow airfoil, thus creating an open ended box lid. The fins provide additional directional stability while affording appropriate local area rule for transonic flight. Furthermore, the volumetric distribution of the high altitude low flying platform hull is suited for a lacent ogee delta wing on a balanced on air platform utilizing the high altitude low flying platform hull.

It is an object of the invention to provide a high altitude low flying hull for a platform that combines the role of an aircraft, a ship, and a surface effect platform. It is also an object of the present invention to provide a hull that provides stability and no noticeable adverse control effects when utilizing the platform as an aircraft, a ship, a boat, or as a surface effect platform. It is another object of the invention to provide a high altitude low flying platform hull for a platform/aircraft that can lift in water, travel at high altitudes, be a low flying aircraft, and a surface effect platform. It is also an object of this invention to provide a high altitude low flying platform hull that can be used on a platform that can operate with complete stability both as a surface effect vehicle and a high altitude aircraft.

It is another object of the invention to provide a high altitude low flying platform hull that can provide a hull that can be used for both a surface effect vehicle and a conventional aircraft.

It is also an object of the invention to provide a high altitude low flying platform hull that minimizes spray from water, minimizes impacts at high speeds, and has lower drag than equivalent systems.

It is an object of the invention to provide a high altitude low flying platform hull that creates a stable, efficient platform for flight in and out of surface effect. It is also an object of the invention to provide a high altitude low flying platform hull that is efficient for high speed long distance operation during surface effect travel, and allows high altitude flight.

It is an object of the invention to provide a high altitude low flying platform hull that allows a high lift chambered hull to remain in surface effect when airspeed is sufficient to generate the lift required to fly.

It is also an object of the present invention to provide a high altitude low flying platform hull that has capabilities to operate as a battlespace dominance platform, which supports major mission areas individually or in combination. It is also an object of the present invention to provide a high altitude low flying platform hull that has the capabilities of transporting heavy loads such as passengers, military troops, military equipment (tanks, construction equipment, and the like), cargo, and the like during both surface effect travel and high altitude flight.

DRAWINGS

These and other features, aspects and advantages of the present invention will become better understood with regard to the following description and appended claims and accompanying drawings where:

DESCRIPTION

Figure 1:
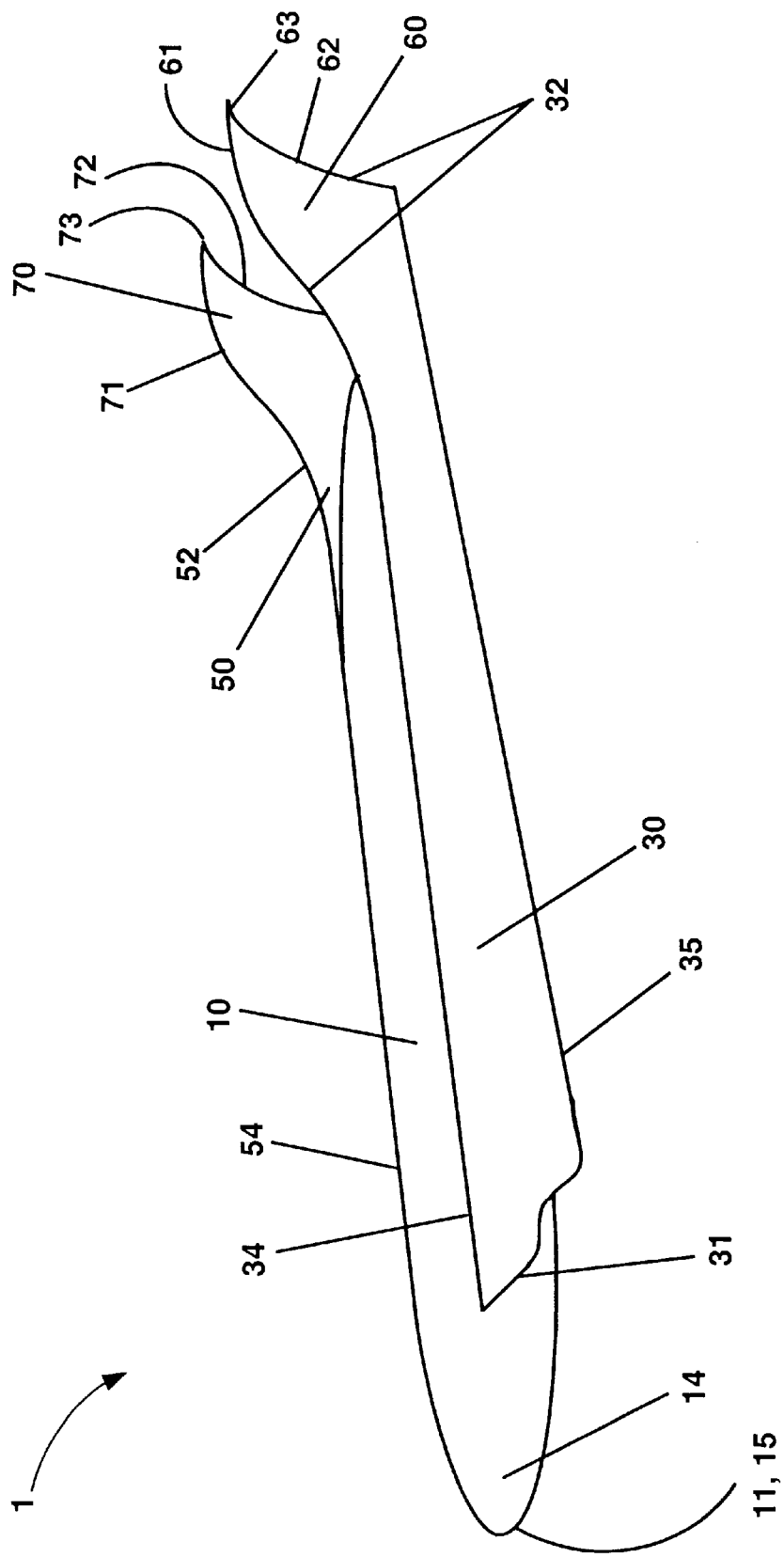
FIG. 1 shows a perspective view of the high altitude low flying platform hull.

The preferred embodiment of the present invention is illustrated by way of example in FIGS. 1–7. As shown in FIGS. 1–7, the high altitude low flying platform hull 1 includes a laminar flow airfoil 10, a first slab side 30, a second slab side 50, a first fin 60 and a second fin 70.

A laminar flow airfoil 10 is an airfoil specifically designed to maintain laminar flow about itself, especially at transonic or supersonic speeds. Laminar flow is typically described as a nonturbulent airflow over or about an airfoil or other body, made up of thin layers or streamlines without large fluctuations. An airfoil is a surface or body especially designed to obtain a reaction, such as lift or thrust, from the air through which it moves. The laminar flow airfoil 10 may be a rigid structure, of large superficial area relative to its thickness. The laminar flow airfoil 10 is designed to obtain, when driven through air at an angle inclined to the direction of motion, a reaction from the air approximately at right angles to its surface. The laminar flow airfoil 10 allows a streamline flow of a viscous fluid (gas or liquid) around or on the laminar flow airfoil 10 that satisfies the Navier-Stokes equations of motion. The laminar flow airfoil 10 also allows flow around or on the laminar flow airfoil 10 that occurs at a low Reynolds numbers (the ratio of inertia force to the viscous force).

Within the laminar flow airfoil 10 there may be cargo space, the cockpit, an engine, a passenger area, a military transport area, or the like. The laminar flow airfoil 10 may be manufactured from steel, metal, any type of alloy, any material used to manufacture aircraft fuselages or ship hulls, or the like. In the preferred embodiment the laminar flow airfoil 10 is manufactured from aluminum.

Figure 2:
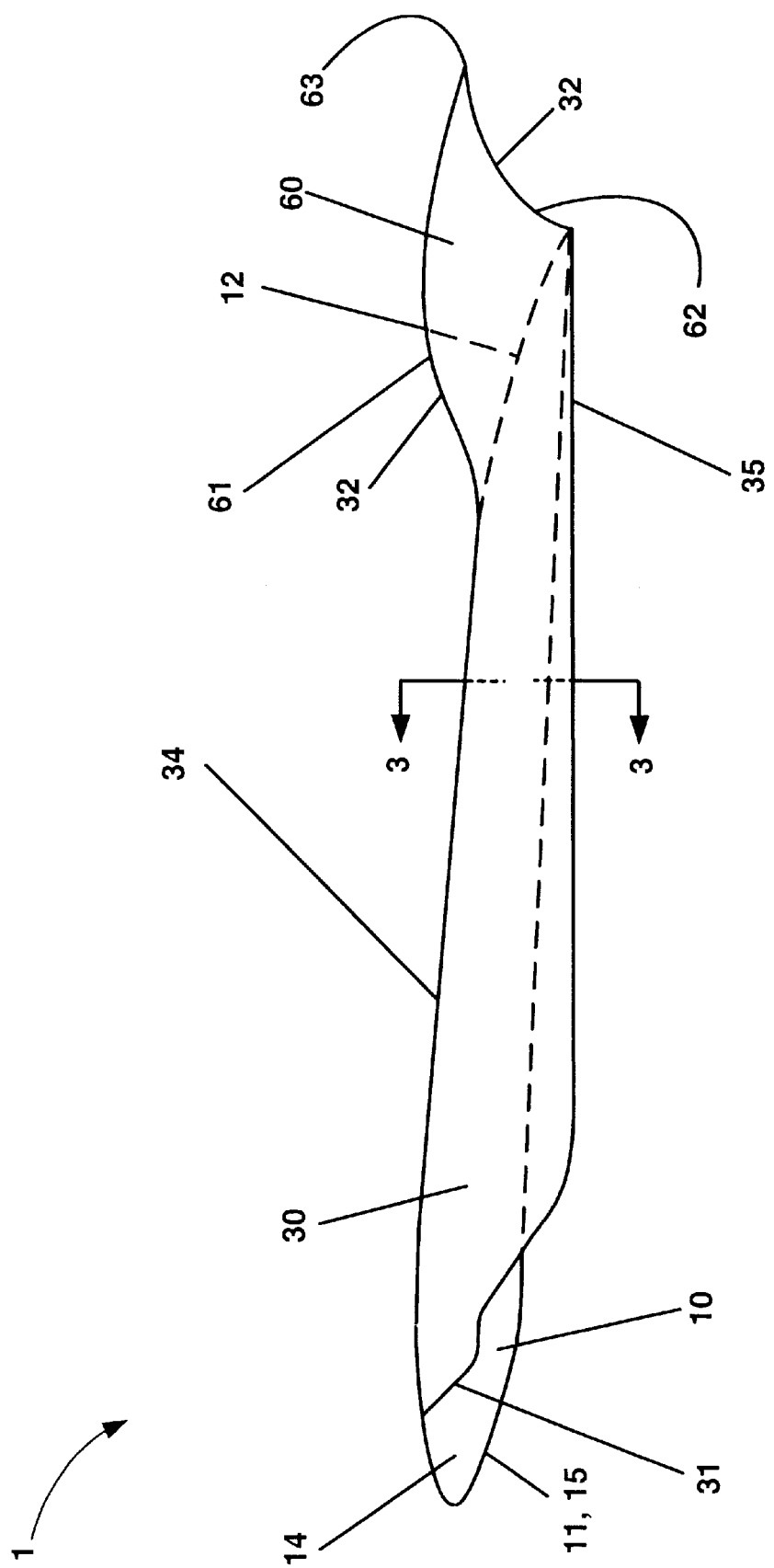
FIG. 2 shows a side view of the high altitude low flying platform hull.
Figure 6:
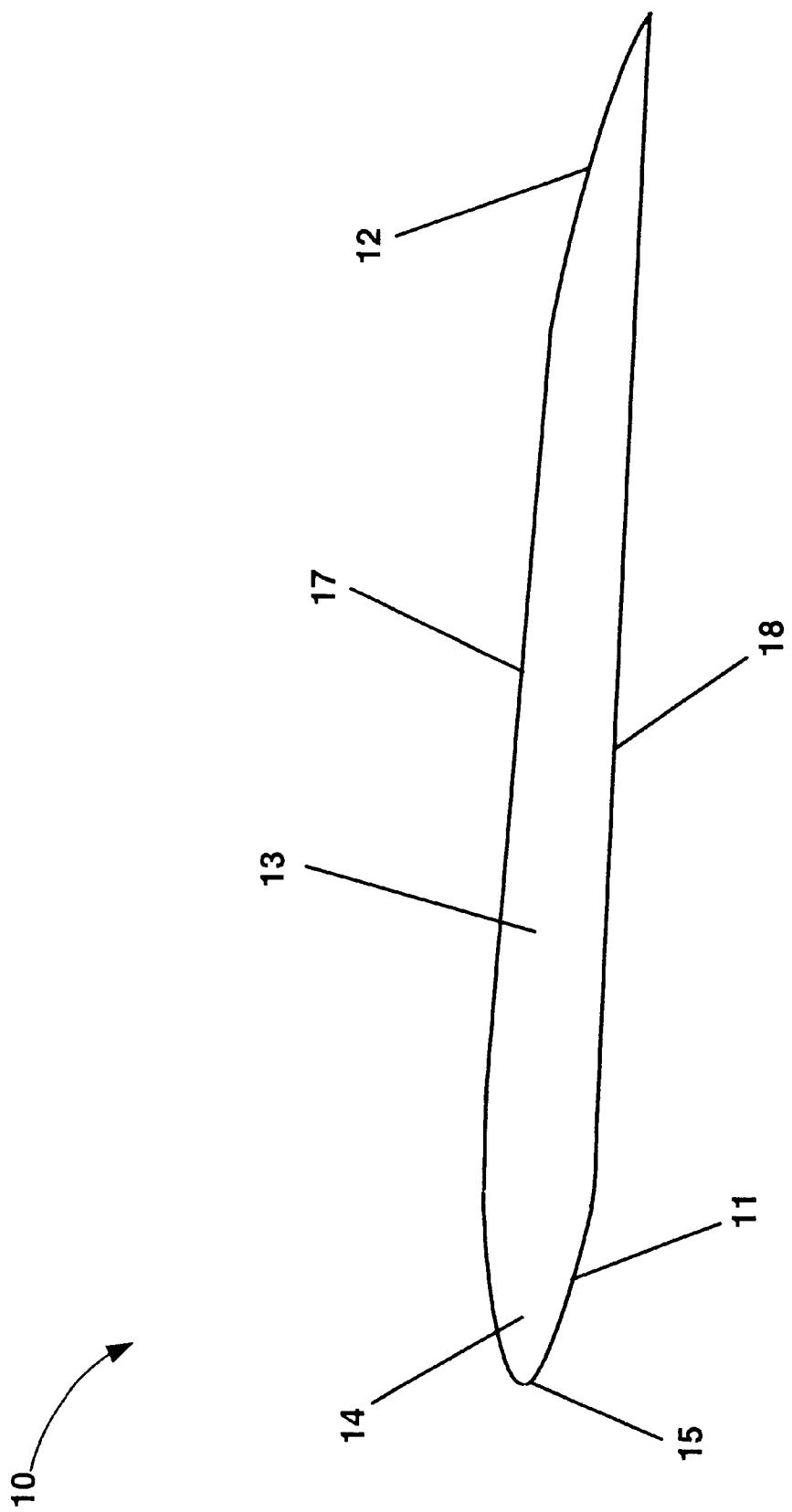
FIG. 6 shows a side view of the laminar flow airfoil.

As seen in FIGS. 2 and 6, the laminar flow airfoil 10 has a laminar flow airfoil leading edge 11, a laminar flow airfoil trailing edge 12 and a laminar flow airfoil center portion 13. A leading edge is typically described as the edge or section of an airfoil or any type of structure which first meets or bites the air. A trailing edge is typically described as the edge or section of the airfoil or structure over which the airflow passes last. The laminar flow airfoil leading edge 11 may be a nose 14. The nose 14 has a nose leading edge 15 and may be an ellipse shaped conic section. The preferred embodiment of the nose leading edge 15 may be part of an ogivoid or ogive, ellipsoid or other geometric shape which is faired into the first slab side 30 and the second slab side 50. An ogive is typically described as a pointed arch, or a curve determining the shape of the head of a projectile, or the curved or tapered front of a projectile or a reverse curve. An ellipse is typically described as a closed curve in the form of a symmetrical oval. The minimum length of the major axis of the nose 14 can be about 3 to about 5 times that of the minor axis. The nose 14 may come to a point.

Figure 3:
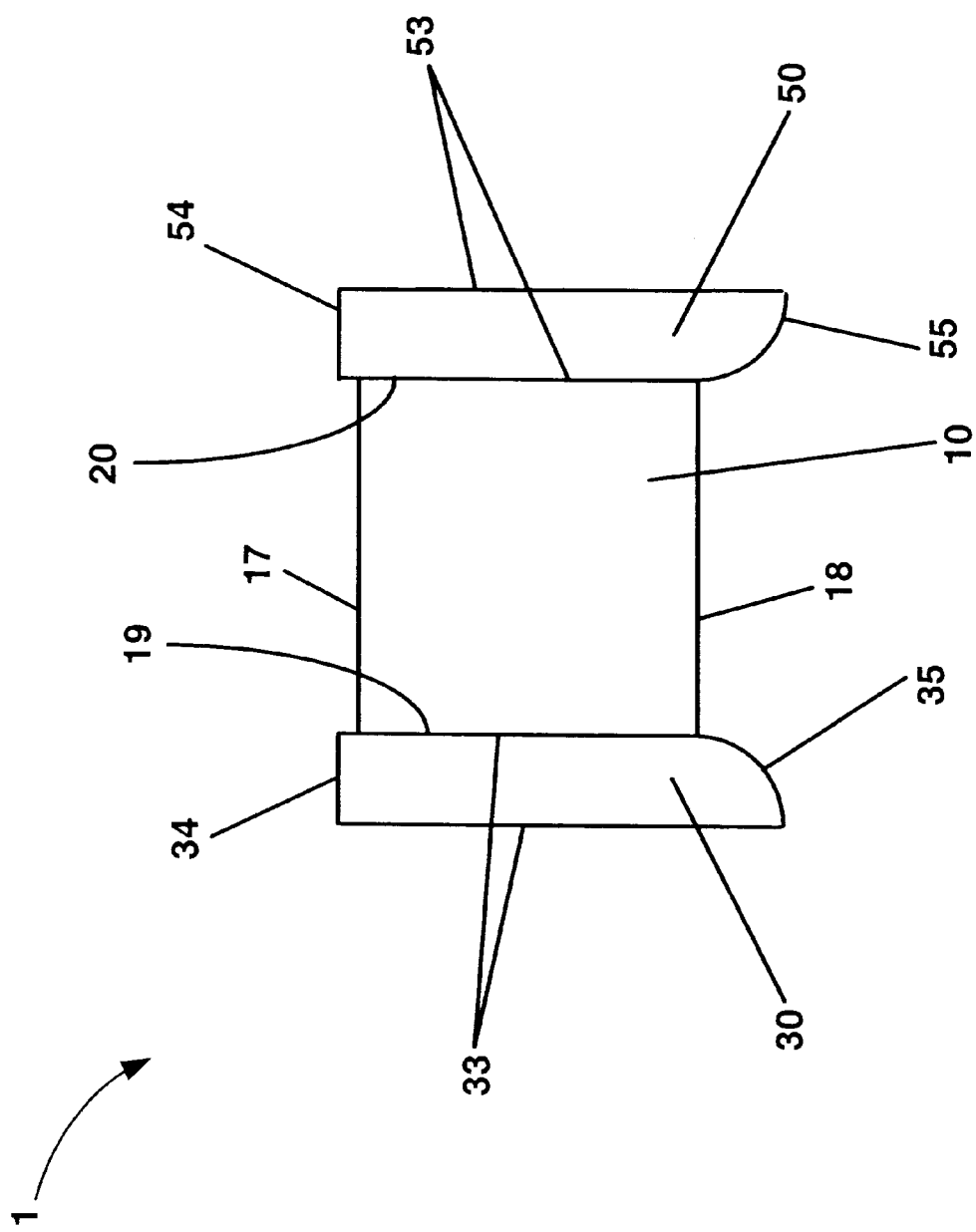
FIG. 3 shows a cross sectional view of the high altitude low flying platform hull (Section 3—3 of FIG. 2)

The laminar flow airfoil center portion 13 may be, but without limitation, a structure, a container, a case, a housing, a jacket, a sleeve, a frame, or the like with a primarily square, elliptical, circular or rectangular cross section. The laminar flow airfoil center portion 13 may be similar to a tube, a pipe, a cylinder, a hollowed beam or arm, or the like. The laminar flow airfoil center portion 13 may also be similar to the center portion of an airplane fuselage or submarine hull. As seen in FIGS. 3 and 6, the laminar flow airfoil 10 can further include a top portion 17, a bottom portion 18, a first side portion 19 and a second side portion 20. At the laminar flow airfoil trailing edge 12, the top portion 17 of the laminar flow airfoil 10 may slope downward to meet with the bottom portion 18 of the laminar flow airfoil 10. The preferred downward angle of the top portion 17 at the laminar flow trailing edge 12 from a horizontal axis (the x-axis in a typical geometric configuration) is in the range of about 10 degrees to about 40 degrees. The bottom portion may also be at a slope. The inclination of the bottom portion 18 of the laminar flow airfoil 10 relative to the horizontal axis may be in the range of about 2 degrees to about 5 degrees.

The first slab side 30 and second slab side 50 are typically substantially similar in shape and size, or may be twins. They may be, but without limitation, in the form of plates, sidewalls, sheets, boards, etc. The first slab side 30 and second slab side 50 may be smooth and flat. The first slab side 30 and second slab side 50 may be manufactured from any metal or metal alloy. The preferred material is aluminum.

As seen in FIGS. 2 and 3, the first slab side 30 includes a first slab side leading edge 31, a first slab side trailing edge 32, and two first slab side flank sections 33. The second slab side 50 includes a second slab side leading edge 51, a second slab side trailing edge 52 and two second slab side flank sections 53. The first slab side leading edge 31 has a serpentine or s-shaped first slab side leading edge, while the second slab side leading edge 51 has a serpentine or s-shaped second slab side leading edge. The leading edge of the slab sides may be angled at about 45 to about 60 degrees from the horizontal and an arc of a circle tangent to the leading edges may join the slab sides to the keel (the bottom of a boat or ship specifically the bottom portion 18 of the laminar flow airfoil 10.) Both the first slab side 30 and second slab side 50 mate or are attached to the laminar flow airfoil 10 at incidence (about 2.0 to about 3.5 degrees). This creates a channel, which continually accelerates the air/water and as speed is increased forces the air under the hull such that the hull is lubricated and experiences air friction rather than fluid frictional drag. This significantly reduces the hull frictional drag for take off and reduces the hydrodynamic loads on the hull itself. As seen in FIG. 3, the first slab side 30 may mate to the laminar flow airfoil 10 at the first side portion 19 of the laminar flow airfoil 10 while the second slab side 50 may mate to the laminar flow airfoil 10 at the second side portion 20 of the laminar flow airfoil 10. In the preferred embodiment, the first slab side 30 mates to the laminar flow airfoil 10 at one of the first slab side flank sections 33 and the second slab side 50 mates to the laminar flow airfoil 10 at one of the second slab side flank sections 53. The first slab side leading edge 31 and second slab side leading edge 51 intersect the nose leading edge 15. The sweep angles (or slant backward) for the straight part of the first slab side leading edge 31 and second slab side leading edge 51 is in the range of about 30 degrees and about 60 degrees and is governed by local area ruling and spray attenuation considerations.

As shown in FIG. 3, the first slab side 30 may have a first slab side top portion 34 and a first slab side bottom portion 35. The second slab side 50 may have a second slab side top portion 54 and a second slab side bottom portion 55. In the preferred embodiment the first slab side 30 and second slab side 50 are parallel and are disposed on opposite sides of the laminar flow airfoil 10. When the platform is at rest, the first slab side bottom portion 35 and second slab side bottom portion 55 both have the ability to communicate with the surface that the platform would travel over.

As shown in FIGS. 1 and 2, the first slab side trailing edge 32 extends upward to create the first fin 60, while the second slab side trailing edge 52 extends upward to create the second fin 70. A fin is typically described, but without limitation, as a vertical stabilizer or as a fixed or adjustable vane or airfoil affixed longitudinally to an aerodynamically or ballistically designed body for stabilizing purposes and locally area ruled to reduce transonic drag. In the preferred embodiment, the first fin 60 and second fin 70 are parallel and substantially similar in size and shape. The first fin 60 has a first fin leading edge 61 and a first fin trailing edge 62. The second fin 70 has a second fin leading edge 71 and a second fin trailing edge 72. As shown in FIGS. 1 and 2, the first fin 60 can extend upward from the first slab side top portion 34. This is the first fin leading edge 61. The second fin 70 can extend upward extending from the second slab side top portion 54. This is the second fin leading edge 71. The preferred contour upward angle of the first fin leading edge 61 and the second fin leading edge 71 from a horizontal axis is described by a polynomial of the $7^{th}$ order with 5 terms. After a predetermined distance of upward angle the first fin 60 and second fin 70 can level off at a certain point and slope upward at a smaller angle to the horizontal plane, or even curve slightly downward. The preferred angle of this slope from a horizontal axis is in a range between about 30 degrees to about 45 degrees or may be contoured to conform with the equivalent area rule. At the apogee or apex of the first fin 63 and apogee or apex of the second fin 73, the first fin trailing edge 62 and second fin trailing edge 72 may slope inward and downward at a negative angle or may be contoured to be consistent with local equivalent area ruling. The downward angle of the first fin trailing edge 62 and second fin trailing edge 72 from a horizontal axis may be in a range of about 30 degrees to about 45 degrees or may be contoured to conform with equivalent area rule. The sweep (slant backward or forward) of the first fin trailing edge 62 and second fin trailing edge 72 may be in the range of about 120 degrees to about 160 degrees. It may also be described by part of an ogive or ellipse allowing it to conform to equivalent area rule technique.

In the preferred embodiment, the first fin trailing edge 62 meets with the laminar flow airfoil trailing edge 12, while the second fin trailing edge 72 also meets with the laminar flow airfoil trailing edge 12. However, the first fin trailing edge 62 and second fin trailing edge 72 do not necessarily meet. In the preferred embodiment, the first fin trailing edge 62 and the second fin trailing edge 72 are parallel. As shown in FIG. 2, the first fin trailing edge 62, first slab side bottom portion 35 and laminar flow airfoil trailing edge 12 may meet, while the second fin trailing edge 72, second slab side bottom portion 55 and laminar flow airfoil trailing edge 12 may also meet.

The first fin 60 and second fin 70 can house actuators and electronic sensors or any other type of electronics or items that need to stored or housed.

As shown in FIGS. 2 and 3, in the preferred embodiment, the first slab side 30 and second slab side 50 extend beneath the laminar flow airfoil 10. The top portion 17 of the laminar flow airfoil 10 as well as the first slab side top portion 34 and second slab side top portion 54 may slope downward from their leading edges to their trailing edges. In the preferred embodiment, the top portion 17 of the laminar flow airfoil 10, the first slab side top portion 34 and second slab side top portion 54 are juxtaposed. The laminar flow airfoil 10, first slab side top portion 34 and second slab side top portion 54 may be at an angle to the first slab side bottom portion 35 and second slab side bottom portion 55.

Figure 7:
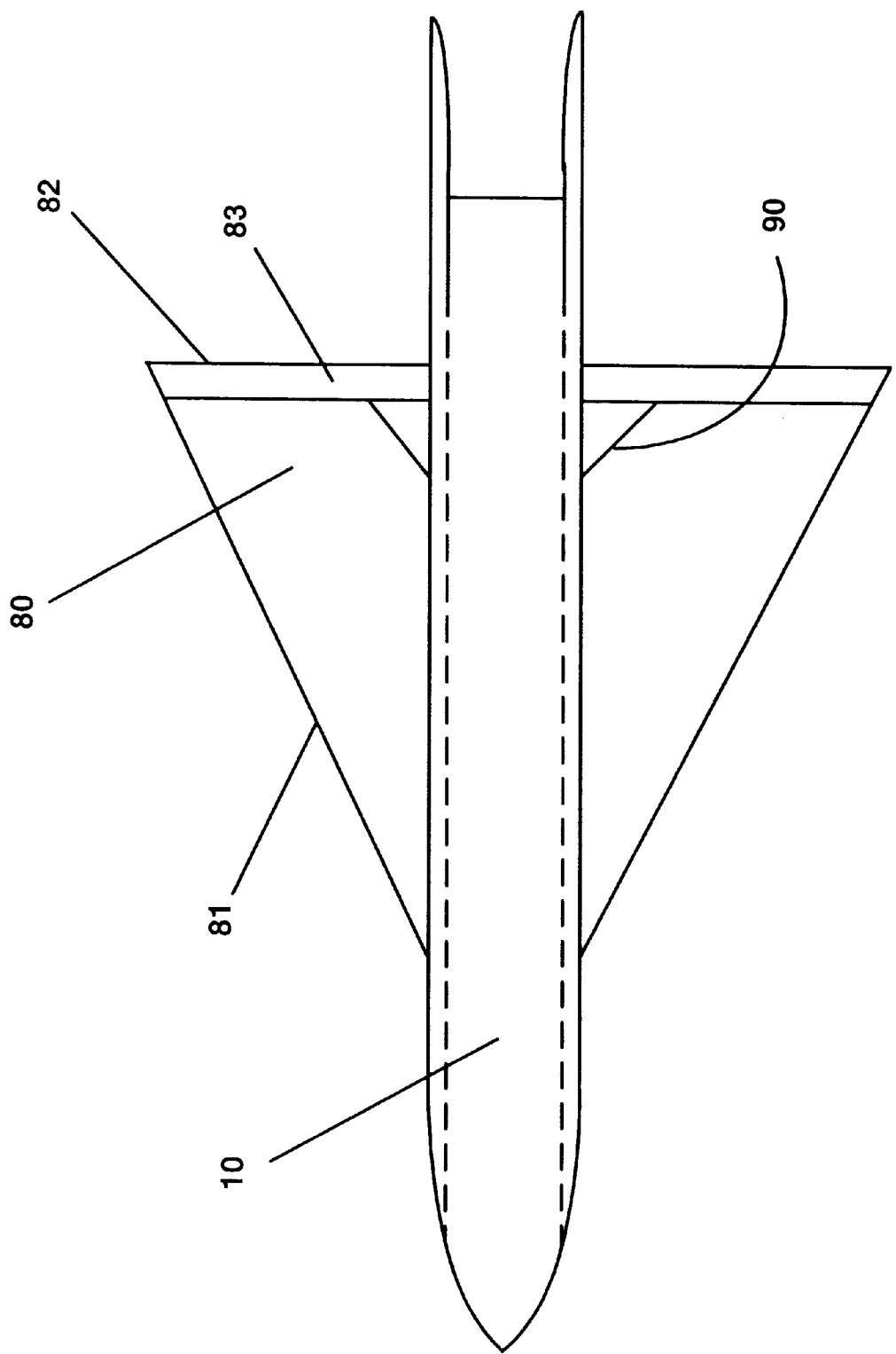
FIG. 7 shows a top view of the high altitude low flying platform hull with a delta wing attached to the high altitude low flying platform hull.

As shown in FIG. 7, the high altitude low flying platform hull 1 may be attached to a delta type wing or wings, which is more commonly referred to as a delta wing 80. A delta wing 80 is a wing design with swept-back wings. The delta wing 80 includes a delta wing leading edge 81 and a delta wing trailing edge 82. The delta wing 80 when looked at below or above, gives the platform or aircraft the appearance of a lacent ogee or a modified isosceles triangle. The delta wing trailing edge 82 forms one straight line to become the base of the lacent ogee or modified isosceles triangle. The delta wing 80 also contains a wing bottom and a wing top.

The high altitude low flying platform hull 10 may have bulkheads 90 attached to it. A bulkhead 90 is typically defined as a partition or frame serving to divide, support or give shape to the fuselage float, or hull of a platform. A bulkhead 90 may consist of a vertical-reinforcing member made hollow like a hoop or made solid. The bulkheads 90 from the high altitude low flying hull 10 may mate with the wing spars 83 in the delta wing 80. A spar is typically, but without limitation, any principal structural member of an airfoil, especially in a wing, running from tip (outer end of a wing) to tip or from root (the base of a wing where it joins the body of an aircraft) to tip. The delta wings 80 may be attached through bulkheads 90 and/or frames which attach to the wing spars 83. The high altitude low flying platform hull 10 may have longitudinal webs, which absorb shear loads between the wing and hulls that result from the hydrodynamic drag loads.

Between the top portion 17 of the laminar flow airfoil 10 and the wing bottom there may be a boundary layer diverter and an attachment structure. A boundary layer is typically defined as a thin layer of air next to the airfoil, distinguishable from the main airflow by distinctive flow characteristics of its own set up by friction. The boundary layer diverter turns this boundary layer aside from a course, specifically away from the platform. The attachment structure allows attachment of the delta wing 80 to the laminar flow airfoil 10. The attachment structure may be a configuration of fasteners along with an attachment support member. The sweep of this is identical to the wing sweep and the step/notch is about 5% to about 15% of the mean wing chord at the centerline of the high altitude low flying platform hull 1. The purpose of this notch is to assure the uninterrupted growth of leading edge vortex as the wing angle of attack increases.

Figure 4:
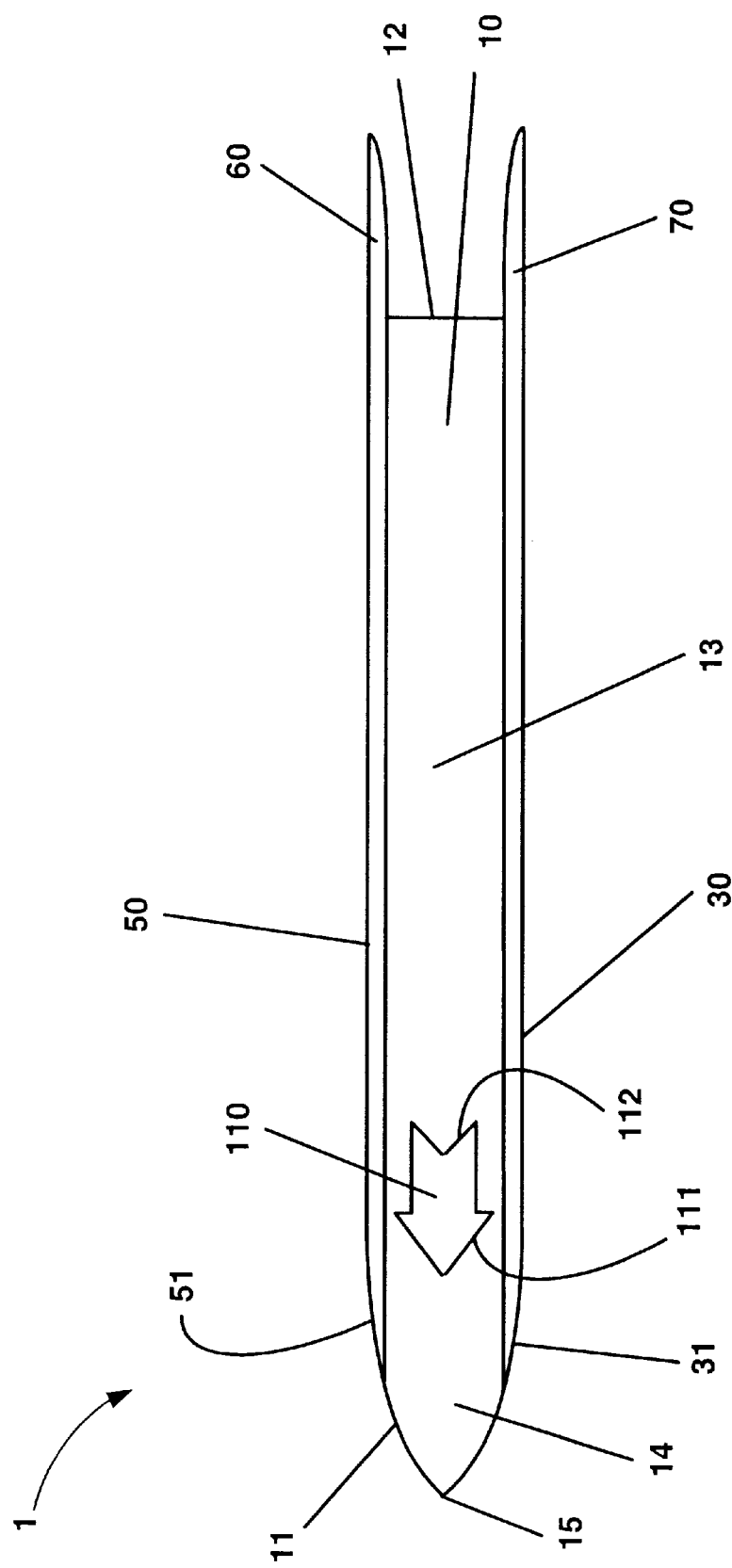
FIG. 4 shows a bottom view of the high altitude low flying platform hull.
Figure 5:
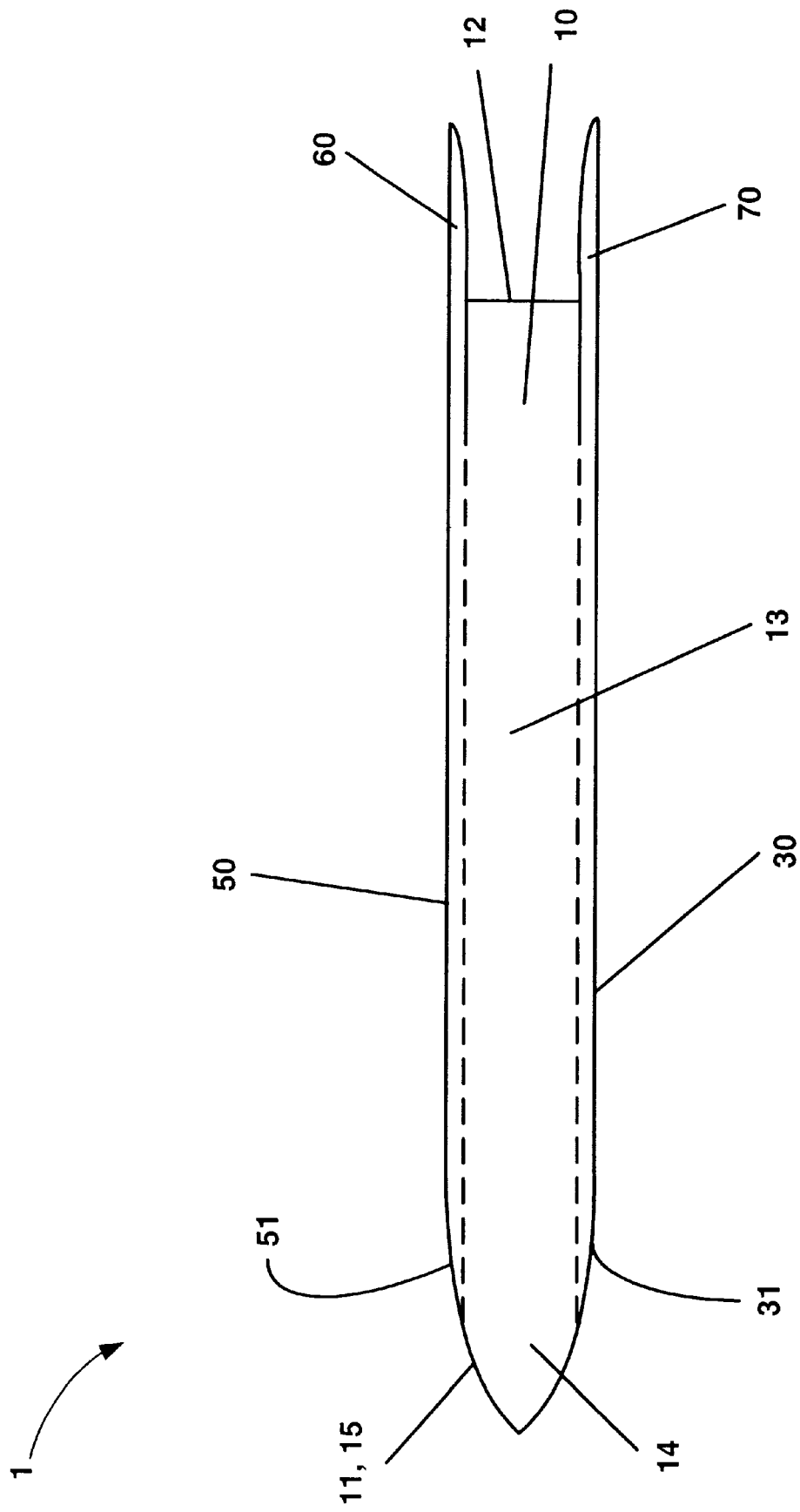
FIG. 5 shows a top view of the high altitude low flying platform hull.

For certain Balonair applications, there may be a hydrofoil 110 between the first slab side 30 and second slab side 50. As shown in FIG. 4, the hydrofoil 110 may be attached to the bottom portion 18 of the laminar flow airfoil 10. A hydrofoil 110 is typically, but without limitation, a foil or surface designed to obtain a reaction, such as support, from water through which it moves. The hydrofoil 110 compensates for the nose 14 down pitching moment created by the airfoil at incidence. In the preferred embodiment, the hydrofoil 110 is a swept wing design with a compound hydrofoil leading edge 111 and a hydrofoil trailing edge 112. A swept wing design is typically, but without limitation, a wing or structure on which the leading edge and trailing edge have sweep back, and the trailing edge forms an acute angle with the longitudinal axis of the aircraft aft (at, near or toward the rear) of the root (base of the hydrofoil 110). The compound hydrofoil leading edge 111 and the hydrofoil trailing edge 112 sweep in the form of leading edge and trailing edge apexes. The compound sweep on the hydrofoil 110 allows the water to be pierced and the top surface to be vented to reduce hydrodynamic loads. The hydrofoil trailing edge 112 may be a three suspension point trailing edge which allows high-pressure air to escape under the hydrofoil 110 to greatly increase its ability to unwet and therefore promote rapid take-offs (along with other aspects of this configuration.) The hydrofoil 110 may have an intercepting spanwise leading edge and a span tip. The hydrofoil 110 may be placed so that its intercepting spanwise leading edge and its span tip coincide with the first slab side leading 31 and the second slab side leading edge 51 such that a zero angle of incidence is achieved.

Although the present invention has been described in considerable detail with reference to certain preferred versions thereof, other versions are possible. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C 112 paragraph 6. In particular, the use of "step of" or "means for" in the claims herein is not intended to invoke the provisions of 34 U.S.C. 112 paragraph 6.

What is claimed is:

1. A high altitude low flying platform hull, comprising:
   (a) a laminar flow airfoil, the laminar flow airfoil having a nose, the nose having a nose leading edge;
   (b) a first slab side, the first slab side having a first slab side leading edge and a first slab side trailing edge, the first slab side leading edge being serpentine;
   (c) a second slab side, the second slab side having a second slab side leading edge and a second slab side trailing edge, the second slab side leading edge being serpentine, the first slab side and the second slab side mate to the laminar flow airfoil, the first slab side leading edge and the second slab side leading edge intersect the nose leading edge;

(d) a first fin, the first slab side trailing edge extending upward to create the first fin; and (e) a second fin, the second slab side trailing edge extending upward to create the second fin.

2. The high altitude low flying platform hull of claim 1, wherein the laminar flow airfoil further includes a top portion, a bottom portion, a laminar flow airfoil trailing edge, the top portion and the bottom portion meet at the a laminar flow airfoil trailing edge.

3. The high altitude low flying platform of claim 2, wherein the first slab side and the second slab side are substantially similar in shape and size.

4. The high altitude low flying platform of claim 3, wherein the first slab side and the second slab side are parallel.

5. A high altitude low flying platform hull, comprising:

(a) a laminar flow airfoil, the laminar flow airfoil having a nose, the nose having a nose leading edge, the laminar flow airfoil further includes a top portion, a bottom portion, a laminar flow airfoil trailing edge, the top portion and the bottom portion meet at the laminar flow airfoil trailing edge;

(b) a first slab side, the first slab side having a first slab side leading edge and a first slab side trailing edge, the first slab side leading edge being serpentine;

(c) a second slab side, the second slab side having a second slab side leading edge and a second slab side trailing edge, the second slab side leading edge being serpentine, the first slab side and the second slab side being parallel and substantially similar in shape and size, the first slab side and the second slab side mate to the laminar flow airfoil on opposite sides of the laminar flow airfoil, the first slab side leading edge and the second slab side leading edge intersect the nose leading edge;

(d) a first fin, the first slab side trailing edge extending upward to create the first fin, the first fin having a first fin leading edge and a first fin trailing edge; and (e) a second fin, the second slab side trailing edge extending upward to create the second fin, the second fin having a second fin leading edge and a second fin trailing edge, the first fin leading edge and the second fin leading edge extend upward at a preferred contour from a horizontal axis as described by a polynomial of the $7^{th}$ order with 5 terms.

6. The high altitude low flying platform hull of claim 5, wherein the nose leading edge is in the shape of a geometric shape selected from the group of ogivoid and ellipsoid, the geometric shape being faired into the first slab side and the second slab side.

7. The high altitude low flying platform of claim 6, wherein at the first fin and the second fin include an apogee, at the apogee the first fin trailing edge and the second fin trailing edge slope downward at a negative angle.

8. The high altitude low flying platform of claim 7, wherein the angle of the downward slope is in a range from about 30 to about 45 degrees.

9. The high altitude low flying platform of claim 7, wherein the first fin trailing edge and the second fin trailing edge are contoured to be consistent with local equivalent area ruling.

10. The high altitude low flying platform of claim 7, wherein the high altitude low flying platform hull further comprises of a delta wing, the delta wing attached to the laminar flow airfoil.

11. The high altitude low flying platform of claim 10, wherein the high altitude low flying platform hull further comprises of a hydrofoil, the hydrofoil being attached to the bottom portion of the laminar flow airfoil.

12. The high altitude low flying platform of claim 11, wherein the hydrofoil comprises of a compound hydrofoil leading edge and a hydrofoil trailing edge, the hydrofoil further having a sweep back design.

13. The high altitude low flying platform of claim 12, wherein the delta wing has a wing bottom, the high altitude low flying platform hull further includes a boundary layer diverter, the boundary layer diverter being disposed between the laminar flow airfoil and the wing bottom.

14. The high altitude low flying platform of claim 13, wherein the high altitude low flying platform hull further includes an attachment structure, the attachment structure attaching the delta wing to the laminar flow airfoil.

\* \* \* \* \*